United States Patent [19]

Jordan et al.

[11] 4,087,134
[45] May 2, 1978

[54] METHOD AND APPARATUS FOR THE PNEUMATIC CONVEYING OF MILK POWDER

[75] Inventors: Walter Jordan, Osterburken; Willi Konrath, Kassel-Wolfsanger, both of Germany

[73] Assignee: AZO-Maschinenfabrik Adolf Zimmermann, Germany

[21] Appl. No.: 729,711

[22] Filed: Oct. 5, 1976

[51] Int. Cl.² .............................................. B65G 53/24
[52] U.S. Cl. ........................................ 302/53; 302/26; 302/42
[58] Field of Search ................... 302/21, 23, 3, 26, 40, 302/41, 42, 52, 53, 58

[56] References Cited

U.S. PATENT DOCUMENTS

| 3,069,205 | 12/1962 | McIver et al. ......................... 302/21 |
| 3,380,780 | 4/1968 | Allen et al. ............................ 302/26 |
| 3,822,919 | 7/1974 | Strom ................................... 302/26 |
| 3,871,711 | 3/1975 | Rusterholz ............................ 302/26 |
| 3,942,840 | 3/1976 | Foster .................................... 302/3 |
| 3,955,853 | 5/1976 | Rusterholz ............................ 302/26 |

*Primary Examiner*—Evon C. Blunk
*Assistant Examiner*—Jeffrey V. Nase
*Attorney, Agent, or Firm*—Craig & Antonelli

[57] ABSTRACT

Milk powder, or similar powder which is liable to smear when under mechanical stress, is conveyed in sucessive plugs or batches in a suction flow which is interrupted at intervals according to the batch size. In apparatus for this purpose, an interval-controlled valve is provided in a suction conveying conduit which is connected via an inlet chamber to the outlet of a container for the powder. The container may have at its outlet a loosening floor operable with pulses of compressed air controlled synchronously with said interval-controlled valve.

5 Claims, 1 Drawing Figure

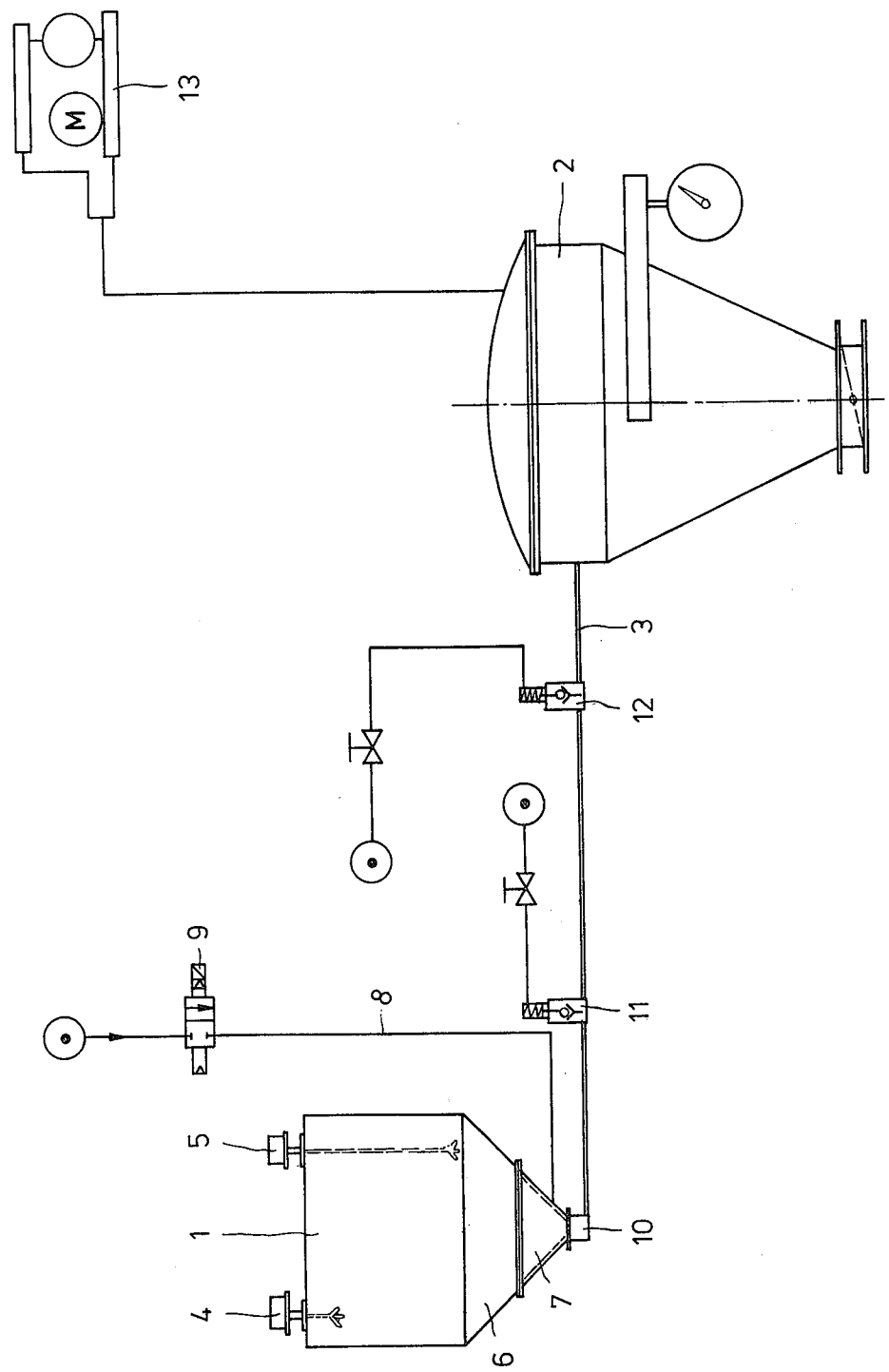

METHOD AND APPARATUS FOR THE PNEUMATIC CONVEYING OF MILK POWDER

The invention relates to a method for the pneumatic batch conveying of milk powder or similar powders which are capable of smearing.

At the present day, installations which operate pneumatically are often used for the conveying of powders which have inconsiderable wearing properties. The powders are conveyed by means of suction air or air under pressure in a continuous conveying stream. In the case of pressure conveying, the pneumatic pressure source is situated at the material take-off point, whereas, in the case of suction conveying, the suction fan is situated at the downstream end of the conveying path. Besides this continuous method, when using compressed air it is also known to have a so-called batch conveying system wherein the material is conveyed away from the take-off point in individual plugs or batches instead of being conveyed continuously. This kind of compressed-air batch conveying installation operates substantially in the same way as a continuous compressed-air installation. It is simply necessary to arrange upstream of the pneumatic pressure source an interval-controlled valve which interrupts the conveying stream at intervals.

With the three aforesaid methods or installations, it is possible to convey without difficulty almost all products which are in powder form. But they fail with milk powder and there are continual blockages. The reason for this is that, as is known, milk powder consists of droplets of fat which are surrounded with a dry layer of albumen and other milk constituents. This milk powder has moderately good flowing properties, but must not be subjected to any mechanical stresses, since in that case the individual grain of powder would burst open and the fat would issue. This produces the well-known smearing and caking effects in containers and conveying installations when dealing with milk powders. For conveying, all three known systems have already been used but without arriving at a satisfactory result, since it is not possible to obviate caking and blockages caused by the aforesaid effect. In order to allow pneumatic conveying despite this, many aids have been used. For example, the conveying conduits have been constructed from elastic material and provided with beaters. Inflatable flexible tubes have also been used for loosening the caking material from the tube walls by means of inflation. But all these aids have also been extremely unsatisfactory and do not provide any permanent remedy.

The invention has as its object to provide a method and an apparatus for pneumatic batch conveying with which milk powders or similar products having smearing effect under mechanical stress can be conveyed without obstruction.

According to one aspect of the present invention, the batches are formed and conveyed in a suction stream and the suction stream is interrupted at intervals corresponding to the batch size.

Thus, batch conveying operation with a suction flow is proposed for the first time. It has been found that this kind of conveying arrangement allows smooth operation for the products which have been discussed, since the speed of flow of the individual batches can be kept substantially lower than with compressed-air batch conveying, with the result that the individual particles of powder are subjected to much less frictional stress in the conduits and much lower impacts at changes of direction than in the case of compressed-air batch conveying. The individual milk powder particle is thus not injured, or is damaged only to such a small extent that no obstructions will occur in the conveying operation. Moreover, with a suction flow, the speed of conveying increases from the take-off point to the delivery point because of the increasing negative pressure, whereas, with a compressed-air installation, the conveying speed behaves in the opposite way. In the latter case, the stress on the individual particle at the take-up point is greater than at the delivery point, so that, with compressed-air installations, caking and blockages frequently occur in the inlet region where the product flows into the conveying conduit.

To carry out the method, the invention uses basically an apparatus comprising a container which contains the milk powder and a conveying conduit which is connected to an outlet of the said container, the said conduit leading to a processing station situated at some distance from the said container, for example a weighing separator. Such installations are usual for pneumatic conveying.

According to another aspect of the invention, in such apparatus the container outlet is connected to an inlet chamber which is connected to the conveying conduit, and an interval-controlled valve for ventilating said conduit is arranged in the conveying conduit.

As compared with compressed-air batch conveying installations, the important advantage is obtained that the installation itself need not be pressure-tight; in particular, the containers need not be constructed as pressure vessels. Thus, in addition to the possibility if conveying milk powder without disturbances, which is afforded for the first time, the cost of the installation is considerably reduced.

According to one constructional form of the invention, the inlet chamber comprises only one connection for the conveying conduit and the interval-controlled ventilating valve is arranged downstream of the inlet chamber in the direction of conveying. This arrangement of the inlet chamber is extremely simple and more particularly is simpler than the pneumatic compressed-air source in the case of a compressed-air installation.

In order to ensure satisfactory outflow of material from a container, it is known to arrange at the outlet a loosening floor consisting of an elastic material which is acted upon with pulses of compressed air controlled by a valve. The elastic deformation prevents bridge formation and the powder is loosened so that it flows out freely. According to a preferred feature of the invention, it is proposed that the interval-controlled ventilating valve in the conveying conduit and said valve in the compressed-air conduit of the loosening floor are controlled synchronously. At the same instant at which the suction air conveying action begins, the loosening floor is actuated so that it is always ensured that a batch of material forms in the inlet chamber.

The invention will now be described, by way of example, with reference to a constructional form of an apparatus for carrying out the method which is shown in the accompanying drawing.

The drawing shows a supply container 1 and a weighing separator 2 which is arranged at the downstream end of the conveying path. The weighing separator 2 is connected to the supply container 1 by a conveying conduit 3. Connected to the purified air chamber of the weighing separator 2 is a fan station 13 which provides the necessary negative pressure.

The supply container 1 is provided with a fullness indicator 4 and an emptiness indicator 5. It comprises a conical outlet 6, the lower region of which is provided with a loosening floor 7. This floor consists of an elastic material arranged in the outlet cone 6, the intervening space between the said material and the cone being connected to a conduit 8 which conveys compressed air from a compressed air circuit and which is controlled by a valve 9, for example a magnetically operated valve. Flange-connected to the outlet cone 6 is an inlet chamber 10 to which the conveying conduit 3 in its turn is connected.

Situated in the conveying conduit 3, directly downstream of the inlet chamber 10, is an interval-controlled ventilating valve 11, which is operated by compressed air from said circuit and which opens and closes the conveying conduit 3 at adjustable or selectable intervals connecting or disconnecting the conduit 3 with atmosphere and thereby ventilating the conduit at intervals. The interval-controlled ventilating valve 11 and the valve 9 which is arranged in the compressed air supply pipe 8 are controlled synchronously, so that at the same instant at which the suction air conveying action begins, the loosening floor 7 is started operating. Finally, there is provided in the conveying conduit 3 a further ventilating valve 12 with which atmospheric air can be introduced into the conduit in order to interrupt conveying and to ventilate the whole installation respectively.

What is claimed is:

1. A method for the pneumatic batch conveying of powders in which the batches are formed and conveyed along a path in a suction flow and the suction flow is interrupted at a point between a feed zone and a receiving zone without the placing of obstructions in said path at intervals corresponding to the batch size while leaving batches downstream of said point under the influence of said suction flow.

2. Apparatus for the pneumatic batch conveying of powders which are liable to smear and cake under mechanical stress, comprising: a container for the said powder, the container having an outlet; a conveying conduit which leads to a remote processing station; an inlet chamber connected to the container outlet, to which chamber the conveying conduit is connected; means for producing a suction flow in the conveying conduit; and means for interrupting the flow at a point between said inlet chamber and said remote processing station without the placing of obstructions in said conveying conduit, said means including an interval-controlled ventilating valve disposed in the conveying conduit, whereby plugs in said line downstream of said valve remain under the influence of said suction flow.

3. Apparatus according to claim 2, wherein the inlet chamber comprises only one connection for the conveying conduit, and the interval-controlled ventilating valve is arranged downstream of the inlet chamber in the conveying direction.

4. Apparatus according to claim 3, wherein the container comprises at its outlet a loosening floor operable with pulses of compressed air, the apparatus including a compressed-air supply conduit leading to the said floor, a valve disposed in the said supply conduit for producing the said pulses, and means for controlling the last-mentioned valve and the said interval-controlled ventilating valve synchronously.

5. Apparatus according to claim 2, wherein the container comprises at its outlet a loosening floor operable with pulses of compressed air, the apparatus including a compressed-air supply conduit leading to the said floor, a valve disposed in the said supply conduit for producing the said pulses, and means for controlling the last-mentioned valve and the said interval-controlled ventilating valve synchronously.

* * * * *